US010420425B2

(12) United States Patent
Resch

(10) Patent No.: US 10,420,425 B2
(45) Date of Patent: Sep. 24, 2019

(54) REFRIGERATED DISPLAY CASE

(71) Applicant: AHT COOLING SYSTEMS GMBH, Rottenmann (AT)

(72) Inventor: Reinhold Resch, St. Peter (AT)

(73) Assignee: AHT COOLING SYSTEMS GMBH, Rottenmann (AT)

( * ) Notice: Subject to any disclaimer, the term of this patent is extended or adjusted under 35 U.S.C. 154(b) by 0 days.

(21) Appl. No.: 15/569,179

(22) PCT Filed: Mar. 23, 2016

(86) PCT No.: PCT/EP2016/056408
§ 371 (c)(1),
(2) Date: Oct. 25, 2017

(87) PCT Pub. No.: WO2016/173782
PCT Pub. Date: Nov. 3, 2016

(65) Prior Publication Data
US 2018/0146800 A1 May 31, 2018

(30) Foreign Application Priority Data
Apr. 29, 2015 (DE) .......... 10 2015 106 620

(51) Int. Cl.
F25B 13/00 (2006.01)
A47F 3/04 (2006.01)
(Continued)

(52) U.S. Cl.
CPC ............ *A47F 3/0443* (2013.01); *F25B 13/00* (2013.01); *F25B 49/025* (2013.01);
(Continued)

(58) Field of Classification Search
CPC ...... F25D 11/022; A47F 3/0443; Y02B 40/32; F25B 2600/0253; F25B 49/025; F25B 2400/061; F25B 2400/22
See application file for complete search history.

(56) References Cited

U.S. PATENT DOCUMENTS 3,585,814 A 6/1971 Van Cauwenberge
2007/0186569 A1* 8/2007 Street ...................... F25B 49/02
62/132

(Continued)

FOREIGN PATENT DOCUMENTS

AT 504774 T 4/2011
DE 266153 A1 3/1989
(Continued)

*Primary Examiner* — Frantz F Jules
*Assistant Examiner* — Martha Tadesse
(74) *Attorney, Agent, or Firm* — McNees Wallace & Nurick LLC

(57) ABSTRACT

A refrigerated display case (20) having at least one unit composed of a plurality of wall assemblies, namely a bottom assembly (22.3), a rear wall assembly, and a top assembly (22.1), which delimit a cooling space at the bottom, the rear, and the top, and having a cooling unit (1) whose components include at least one evaporator (11), one condenser (13, 13'), and one electric control unit (15). An environmentally friendly refrigerated display case (20) is achieved in that the cooling unit (1) includes at least two closed refrigerant circuits (10, 10'), which convey propane as a refrigerant and are each provided with a compressor (12, 12'), and in order to variably control the cooling output, at least one compressor (12, 12') is embodied with a speed regulation and at least one compressor (12, 12') is embodied for operation at a constant speed.

13 Claims, 2 Drawing Sheets

(51) Int. Cl.
*F25B 49/02* (2006.01)
*F25D 11/02* (2006.01)

(52) U.S. Cl.
CPC ......... *F25D 11/022* (2013.01); *A47F 3/0408* (2013.01); *F25B 2400/061* (2013.01); *F25B 2400/12* (2013.01); *F25B 2400/22* (2013.01); *F25B 2600/0253* (2013.01); *F25B 2600/2513* (2013.01); *F25B 2700/195* (2013.01); *Y02B 40/32* (2013.01)

(56) References Cited

U.S. PATENT DOCUMENTS

| | | | | |
|---|---|---|---|---|
| 2010/0257886 | A1* | 10/2010 | Suzuki | F25B 39/02 62/276 |
| 2013/0319030 | A1* | 12/2013 | Nguyen | A47F 3/0447 62/256 |
| 2014/0260411 | A1* | 9/2014 | Rajagopalan | A47F 3/0447 62/441 |
| 2014/0263739 | A1* | 9/2014 | LaMontagne | A47B 3/04 239/302 |
| 2015/0157143 | A1* | 6/2015 | Neelagantan | B23P 19/00 62/251 |
| 2015/0257548 | A1* | 9/2015 | Shapiro | F25B 1/005 62/246 |
| 2015/0297000 | A1* | 10/2015 | Gomes | A47F 3/0447 62/255 |
| 2016/0220040 | A1* | 8/2016 | Resch | A47F 3/0447 |
| 2016/0345752 | A1* | 12/2016 | Resch | A47F 3/0443 |
| 2016/0353906 | A1* | 12/2016 | Rescho | A47F 3/0443 |
| 2017/0007039 | A1* | 1/2017 | Resch | A47F 3/0443 |
| 2017/0013973 | A1* | 1/2017 | Nguyen | A47F 3/0443 |
| 2017/0354271 | A1* | 12/2017 | Neelagantan | A47F 3/0439 |
| 2018/0106524 | A1* | 4/2018 | Bates | A47F 3/0408 |
| 2018/0146799 | A1* | 5/2018 | Resch | F25B 49/005 |

FOREIGN PATENT DOCUMENTS

| | | | | |
|---|---|---|---|---|
| DE | 102010063384 | A1 | 6/2012 | |
| DE | 102012107713 | A1 | 2/2014 | |
| DE | 202014100665 | U1 | 2/2014 | |
| WO | WO 2014029613 | A1 * | 2/2014 | ........ A47F 3/0447 |

* cited by examiner

REFRIGERATED DISPLAY CASE

FIELD OF THE INVENTION

The present invention is directed to refrigeration equipment, and more specifically, to a refrigerated display case.

BACKGROUND OF THE INVENTION

The invention concerns a refrigerated display case and its use, having at least one unit composed of a plurality of wall assemblies, namely a bottom assembly, a rear wall assembly, and a top assembly, which delimit a cooling space at the bottom, the rear, and the top, and having a cooling unit whose components include at least one evaporator, one condenser, and one electric control unit.

In modern refrigerator units, there is increased interest in replacing widely used conventional (generally fluorinated) refrigerants with environmentally friendlier so-called natural refrigerants. One such suitable replacement, for example, is carbon dioxide, but its use is accompanied by a significant equipment expense. In addition, hydrocarbons such as propane or butane have turned out to be well-suited for use as refrigerants, particularly because of their low greenhouse potential, good availability, and advantageous thermodynamic properties for a refrigerant.

But hydrocarbons have a high ignitability so that when they are used as refrigerants, restrictive regulations apply with regard to safety requirements (e.g. IEC 600335-2-89). Thus with a capacity of greater than 150 g of hydrocarbon refrigerant per refrigerant circuit, particularly in enclosed spaces, the safety requirements rise significantly so that significant expense must be incurred to meet these requirements. There is thus a need for development, particularly for required total quantities of greater than 150 g in a refrigerator unit, in order to be able to efficiently use hydrocarbons as environmentally friendly refrigerants.

AT 504 774 A1 has disclosed a refrigerator and freezer unit with a refrigeration machine, which is operated with a natural working substance such as propane or ammonia; in a heat exchanger circuit, $CO_2$ circulates as a heat transfer medium. For personal protection, this document proposes placing the heat exchanger circuits that are operated with $CO_2$ inside the space with the refrigerated display cabinet or wall rack and placing the refrigeration machine separate from this, outside of this space.

The ILK Dresden document: Propane as a Refrigerant in Small Refrigerant Circuits [Propan als Kältemittel in Kleinkältekreisläufen], URL: http:IIwww.ilk dresden.de, describes the development of a mini-channel evaporator in connection with heat pump-clothes dryers, the objective being to minimize the refrigerant capacity to a maximum of 150 g. It should be noted that the use in embodiments with evaporators is difficult.

In DD 2 66 153 D1, a refrigeration unit particularly intended for refrigerated vehicles is disclosed, which has two or more separate refrigerant circuits with shared evaporators and condensers, the objective being to ensure an emergency operation, but also to avoid an oil displacement. The use of and problems in connection with natural refrigerants are not addressed in detail.

Examples for general structures of refrigerated display cases are shown in DE 10 2012 107 713 A1 and DE 20 2014 100 665 U1. Conventional refrigerants are used in refrigerated display cases of this kind.

BRIEF DESCRIPTION OF THE INVENTION

An object of the invention is to create an environmentally friendly refrigerated display case that can be operated in an efficient way.

This object is attained with the refrigerated display case having the features of claim 1 and with the use having the features of claim 10. In the refrigerated display case, the cooling unit includes at least two closed refrigerant circuits conveying propane as a refrigerant, each with a compressor, and, to variably regulate the cooling output, at least one compressor is embodied with a speed regulator and at least one compressor is embodied for operation at a constant speed. Because of this design of the cooling unit, on the one hand, a basic cooling output that is generally always required can be produced by means of the compressor that is operated at a constant speed. Such a compressor can thus be embodied relatively simply and thus inexpensively, with an advantageous mode of operation. At the same time, fluctuations in the required cooling output can be compensated for in a flexible, demand-optimized way by means of the speed-regulatable compressor. In this way, it is possible to produce a refrigerated display case that can be operated efficiently and can also be operated in an environmentally friendly way through the use of propane as a refrigerant.

In an advantageous embodiment, the propane capacity of the refrigerant circuits amounts to ≤150 g each. For this capacity range per refrigerant circuit, the refrigerated display case has to meet much less stringent safety requirements than with a larger propane capacity. As a result, the cooling unit can be operated with largely conventional safety precautions of the kind that generally apply to traditional refrigerants. Additional safety precautions can for the most part be abandoned. If the total refrigerant requirement of propane ranges between 150 and 300 g, the cooling unit can advantageously be operated with only two refrigerant circuits, making it possible to achieve a simpler system than is possible with more than two refrigerant circuits.

For an efficient design, it is advantageous if the refrigerant circuits have a shared evaporator. The shared evaporator is understood to be at least one shared evaporator body for cooling the cooling space; for example, the evaporator body can be a heat exchanger with cooling fins. The lines of at least two closed refrigerant circuits are routed in a thermally conductive connection with the shared evaporator body; for example, the refrigerants of the two circuits can travel in the lines in an opposing flow arrangement relative to each other. Preferably, a separate expansion valve or other expansion device upstream of the evaporator body is allocated to each refrigerant circuit. With a design of this kind, it is possible to reduce the parts cost for the refrigerated display case, which can simplify the installation and can also have an advantageous effect on the space requirements.

In another preferred embodiment variant, the refrigerant circuits have a shared condenser and/or a shared electric control unit for controlling and/or regulating components allocated to the cooling circuits. The shared condenser can in turn be provided with at least one shared heat exchanger to which the refrigerant lines of the respective closed circuits are connected in a thermally conductive fashion. Such a design also makes it possible to reduce the parts cost for the refrigerated display case, which can simplify the installation and can also have an advantageous effect on the space requirements.

If in order to regulate the speed, the electric control unit is connected in a data-exchanging fashion at least to the compressor that is provided with the speed regulation, the compressor can be advantageously regulated by means of the control unit, for example with the inclusion of sensors (e.g. temperature sensors and/or pressure sensors). The sensors in this case are preferably connected to the control unit in order to supply the latter with sensor signals that can be included in the control or regulation.

Advantageously, it is also possible for the speed to be controlled or regulated as a function of a temperature that relates to the refrigerated display case. For example, one or more temperatures can be detected in the cooling space, e.g. in the chilled goods or with regard to the cooling air, and transmitted to the control unit. It would also be conceivable for the temperature data to be further processed in the control unit, for example to calculate an average or another parameter that is used to regulate the speed. If the regulation is not to be carried out by means of the control unit, it would also be conceivable to transmit one or more temperatures directly to the compressor, which can likewise optionally be provided with a regulating device. Preferably, the speed of the compressor is increased in order to increase the cooling output when an excessively low [sic] temperature or a corresponding parameter is present and vice versa.

A spatially optimized design can be achieved by positioning the condenser against, in, or on the rear wall assembly or the top assembly. Good accessibility can also achieved by positioning at least one of the compressors and/or the electric control unit in or on the top assembly. In this connection, it can be particularly advantageous to position it in a housing in or on the top assembly, which offers an additional protection from environmental influences and at the same time, offers visual concealment.

In one advantageous variant, the condenser has an air-cooled heat exchanger; in this case, after having cooled the heat exchanger and before being conveyed out of the refrigerated display case, the air is conveyed past at least one compressor in order to cool the latter. This achieves an efficient cooling air routing that makes full use of the cooling energy in the refrigerated display case. For example, this produces a flow passage from an air conveying device on the back side of the rear wall assembly in the vicinity of a condenser positioned there to the vicinity of a compressor positioned on the top assembly and from there, into the environment.

If the refrigerated display case has a door for closing the cooling space on the front side opposite from the rear wall assembly and is delimited by a respective side wall assembly on each side, the cooling space can be better isolated from the warmer surroundings, which contributes to a lower energy consumption.

A more flexible design of the refrigerated display case can be achieved if the refrigerated display case is composed of a plurality of modules, each having a unit composed of wall assemblies. These can, for example, be arranged in a row without interposed side walls so that the cooling space formed by the modules can be easily varied in length by adding or subtracting individual modules. A design of this kind facilitates the use of standardized components, which in turn has an advantageous effect on keeping components of the refrigerated display case in stock.

It is particularly environmentally friendly and efficient to use a refrigerated display case according to one of the preceding embodiment variants in a refrigerated display case arrangement that has at least one refrigerated display case that can be mounted on a support device above the floor, particularly for installation above a deep freezer resting on the floor. An upper display case of this kind offers the possibility of enlarging a sales area in the vertical direction and thus making better use of the sales area. In tests performed by the inventors, the use as an upper display case of this kind turned out to be particularly advantageous on the one hand because of the cooling volume of such refrigerator units and on the other hand, because of the climate control conditions. For example, in upper display cases with lengths of between 1.2 m and 3 m, preferably between 1.4 m and 2.6 m, a cooling space volume can be produced, which can be suitably operated for cooling chilled goods by means of a cooling unit with two refrigerant circuits, each with a propane capacity of ≤150 g. With an upper display case of this kind, large output fluctuations in the required cooling output can occur, for example for the following reasons. In order to prevent the cold and thus denser and heavier air from "flowing out" of the cooling space, such an upper display case is preferably provided with one or more door(s) that close the front side. If a door is then opened by the customer, for example in order to remove chilled goods, then the cold air nevertheless escapes from the cooling space in the downward direction, causing warm surrounding air to flow in after it. In order to then reinstate the desired cold temperature in the cooling space as quickly as possible, the required cooling output increases temporarily, which can be achieved by increasing the speed of the speed-regulated compressor. In addition to the use as an upper display case, advantages can also be achieved with the use as a refrigerated display case that rests on the floor.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
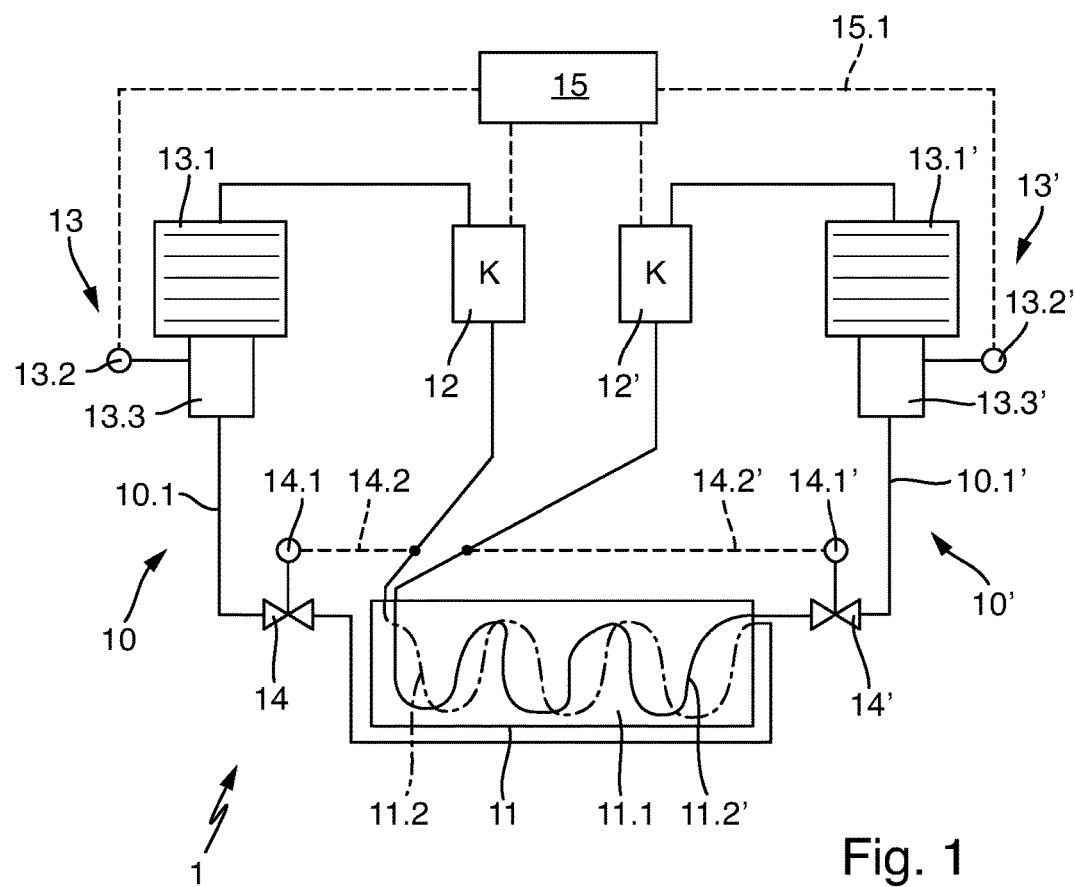
FIG. 1 shows a simplified flow diagram of a cooling unit with two refrigerant circuits and a shared evaporator.
Figure 2:
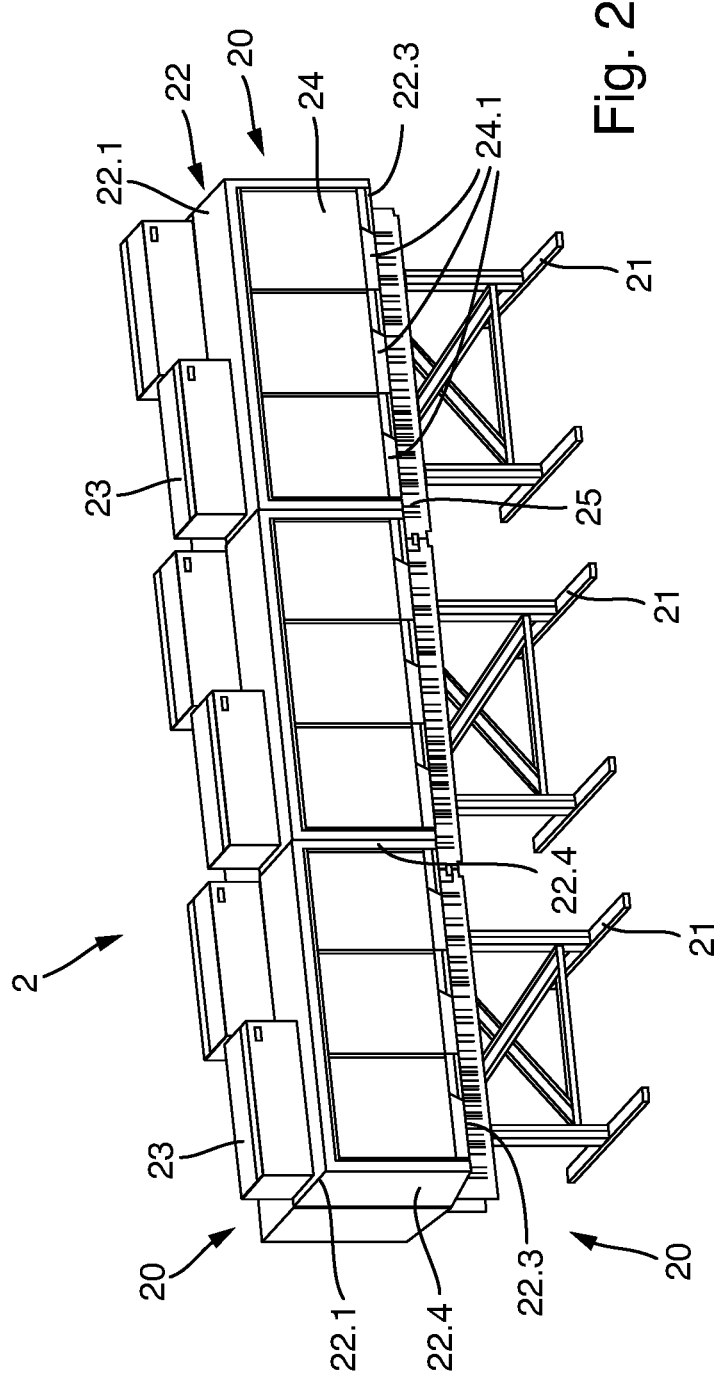
FIG. 2 shows an arrangement of upper display cases with a plurality of upper display cases in a perspective view from above.

FIG. 1 shows a simplified flow diagram of a cooling unit 1 for producing the cooling of the cooling space of a refrigerated display case 20 (see FIG. 2). The cooling unit 1 has two closed refrigerant circuits 10, 10' with respective refrigerant lines 10.1, 10.1', each of which contains propane as the refrigerant, with a capacity preferably ≤150 g. The capacities in this case are preferably equal, but can also be of different sizes, with the components of the cooling unit 1 being embodied with the appropriate capacity for the use of propane as a refrigerant.

As components of the cooling unit 1, a respective compressor 12, 12' is positioned in the refrigerant circuits 10, 10', downstream of a respective condenser 13, 13' with a heat exchanger 13.1, 13.1', a pressure sensor 13.2, 13.2', and subsequent additional condenser components 13.3, 13.3' (e.g. collector, sight glass, etc.) and a respective expansion valve 14, 14' situated downstream of each condenser 13, 13'. For monitoring and/or regulating purposes, the expansion valves 14, 14' are each allocated to a temperature sensor 14.1, 14.1' with a measurement line 14.2, 14.2' in order to measure the temperature of the refrigerant downstream of an evaporator 11. The cooling unit 1 is also has a control unit 15 allocated to it, which is connected via a data-exchange connection 15.1 to the various components of the cooling unit 1 for control, regulation, and/or monitoring purposes.

Other components not allocated to the cooling unit 1 can also be connected to the control unit 15 via a data-exchange connection 15.1. In the present case, the cooling unit is provided with a shared control unit 15 for the two refrigerant circuits 10, 10'. It would also be conceivable for there to be separate partial control units, which can in turn once again be brought into data communication with each other. Other components not shown here can be present in the cooling unit 1, for example different sensors (e.g. pressure sensors, temperature sensors, and/or flowmeters).

The compressors 12, 12' of the refrigerant circuits 10, 10' each serve to increase the pressure level of the refrigerant in the refrigerant circuit 10, 10'; the preferred pressure level with propane as the refrigerant is between 20 and 30 bar. The compressors 12, 12' are embodied differently: one of the compressors 12, 12' is or can be speed-regulated and one can be operated at a static speed. In this case, the compressors 12, 12' are embodied, for example, as reciprocating piston compressors, but other compressor types are also conceivable, e.g. scroll compressors. The static-speed compressor 12 delivers a largely constant output, which can in particular cover a basic cooling output that is constantly required for cooling purposes. It is possible, for example, to use a compressor that is simply embodied with regard to regulation or control, making it possible to achieve cost advantages. This compressor can be connected to the control unit 15 via a data-exchange connection 15.1, e.g. for monitoring purposes.

With the speed-regulatable compressor 12', it is possible to compensate for fluctuations in the required cooling output. Such fluctuations can, for example, be caused by the refrigerated display case 20 being loaded with different quantities of chilled goods, but can also be caused by the removal of chilled goods and an accompanying loss of cold air from the cooling space so that warmer air coming into the cooling space can be brought to the correspondingly required cooling temperature within a short time. By regulating the speed of the speed-regulatable compressor 12', it is possible to vary the delivery rate of the refrigerant in the relevant refrigerant circuit 10' and in this way, to vary the cooling output of the refrigerant circuit 10' and thus also of the cooling unit 1 as a whole. Preferably, the regulation in this case is carried out by means of the control unit 15 based on one or more temperature sensor(s) that is/are likewise connected to the control unit 15 via a data-exchanging connection. These sensors can, for example, measure the temperature of the cooling air in the cooling space and/or the temperature of the refrigerant contained in the circuits and/or the temperature of the chilled goods. With a higher refrigeration demand, the regulation of the compressor speed is used to set a higher cooling output and vice versa.

Downstream of the compressors 12, 12', on the high-pressure side of the refrigerant circuits 10, 10', the compressed refrigerant travels into the respective condensers 13, 13'. In the present example, the circuits 10, 10' each have a separate condenser 13, 13', i.e. with two heat exchangers 13.1, 13.1'. In a likewise preferred exemplary embodiment, however, it is also possible to use a shared condenser 13, i.e. a shared heat exchanger 13.1, to which both of the refrigerant circuits 10, 10' are thermally connected. Other components of the condenser 13 such as the collector (not shown here), however, must also then be separately provided for each circuit 10, 10' because the circuits 10, 10' are once again self-contained. The refrigerant lines 10.1, 10.1' are routed so that they are in thermal contact with the heat exchanger 13.1 in order to dissipate outward the heat that is stored in the refrigerant. In this case, the heat exchanger is air-cooled, for example. It would also be conceivable, however, to use a cooling by means of a liquid such as a brine/water mixture for transporting the heat out of the refrigerant.

The now-cooled liquid refrigerant travels to the respective expansion valves 14, 14', where the refrigerant is expanded to the vapor pressure, which corresponds to approximately 1-2 bar, for example. In the present exemplary embodiment, the expansion valves 14, 14' are embodied as regulatable; via a data-exchange connection 15.1, they communicate with a temperature sensor 14.1, 14.1' that detects the refrigerant temperature downstream of the evaporator 11. The regulation of the expansion valves in this case can likewise be carried out by means of the control unit 15.

Then refrigerant travels into an evaporator 11 located close to the expansion valves 14, 14', which is embodied as a shared evaporator 11 belonging to both of the circuits 10, 10', i.e. with a shared evaporator body 11.1. In this case, the inlets of the refrigerant lines 10.1, 10.1' are each positioned, for example, at the same respective ends of the evaporator body 11.1. The refrigerant lines are routed, for example, in a meandering fashion in condensing coils 11.2, 11.2' through the evaporator body 11.1 so that the flow direction of the two circuits extends in parallel fashion in a kind of unidirectional flow arrangement. Other suitable connection variants and line-routing variants are conceivable, e.g. with connections at opposite ends and opposing flow directions in a kind of opposing flow arrangement. It would also be conceivable to provide each of the circuits 10, 10' with a respective, separate evaporator body 11.1. The evaporator body 11.1 has a large cooling area and is in thermal contact with the cooling space in order to draw heat from it and convey it away by means of the refrigerant. The refrigerant is conveyed in the condensing coils 11.2, 11.2' in contact with the evaporator body 11.1 in such a way that the heat absorbed from the cooling space via the evaporator body 11.1 is transmitted to the refrigerant. In this case, the refrigerant is heated and vaporizes. Then, the refrigerant is delivered to the compressors 12, 12' again and conveyed in the circuit.

FIG. 2 shows an upper display case arrangement 2 in which a plurality of refrigerated display cases 20, in this case six, are used as upper display cases. In this case, three upper display cases are arranged with their rear wall assemblies (which are not visible due to the arrangement) facing three other upper display cases, with each pair of upper display cases with their rear wall assemblies against each other being supported by means of a support device 21. As a result, the upper display case arrangement 2 forms a kind of island arrangement, which is accessible from two opposite sides. It would also be conceivable to arrange the upper display cases with the rear wall assembly along the wall of a room. Advantageously, other refrigerator units, in particular a deep freezer arrangement or a flat refrigerated counter or the like, can be arranged underneath the upper display cases.

In the individual refrigerated display cases 20, each unit composed of wall assemblies 22 includes a cooling space, the unit including a top assembly 22.1, a bottom assembly 22.3, and the rear wall assembly. In addition, the cooling space is delimited relative to the surroundings on both sides by a respective side wall assembly 22.4. The wall assemblies in this case can be embodied as multilayered, for example, and/or can include elements positioned therein or thereon, such as support elements and support beams. In particular for mounting purposes, underneath the bottom assembly in the extension of the course of the rear wall assembly, a cover plate 25 is placed over the length of the refrigerated display case arrangement, which plate can serve, for example, to connect to another refrigerator unit positioned underneath the refrigerated display case 20. The front side of the cooling space is closed by means of three doors 24 provided with handles 24.1, preferably glass doors. The doors 24 are, for example, hinged doors that can be opened toward the side or toward the top, but can also be embodied in the form of sliding doors. They produce a largely sealed closure of the cooling space in relation to the warmer surroundings. The above-described refrigerated display case 20 has a length of between 1.2 m and 3 m, preferably between 1.4 m and 2.6 m, a height without the top structure of between 0.5 m and 1.5 m, preferably between 0.8 m and 1.2 m (height of the refrigerated display case 20 itself, not its installation height), and a depth of between 0.3 m and 0.9 m, preferably between 0.5 m and 0.75 m.

On the top assembly 22.1, there is also an assembly housing 23 provided as a top structure, which contains components of the cooling unit 1 and possibly other components. In this case, such components of the cooling unit 1 can in particular be the condenser(s) 13, 13' along with the heat exchangers 13.1, 13.1' and/or the control unit 15. The assembly housing 23 is positioned so that it is set back and toward one side on the top assembly 22.1 so that one of its side walls ends approximately flush with one of the side wall assemblies 22.4 of the refrigerated display case 20 and its rear wall ends approximately flush with the rear wall assembly thereof. In this way, the assembly housing 23 is inconspicuous when viewed from the front, but is also positioned so that it is easily accessible in the upper display case arrangement 2.

A use of the refrigerated display case 20 as an upper display case, as in the embodiment shown, has turned out to be particularly suitable since in this connection, because of the arrangement, naturally larger fluctuations in the required cooling output occur than, for example, in deep freezers or also refrigerated display cases that are open at the front. For example, if the door 24 is opened to remove chilled goods from the cooling space, then the air that is heavier because it is cold and therefore denser "flows" forward out of the cooling space, as a result of which warm ambient air flows into the cooling space in order to maintain the air volume. This warm air must then be cooled down to the cooling temperature, meaning that the required cooling output is temporarily elevated until the air is cooled. Longer-lasting fluctuations in cooling output occur, for example, because the amount to be cooled in the refrigerated display case 20 decreases more and more over time as chilled goods are removed. The supplied cooling output can be selectively and quickly adjusted to such fluctuations in cooling output by means of the speed-regulatable compressor 12', thus making it possible to achieve a demand-optimized operation of the cooling unit. At the same time, a more or less continuously required basic demand for cooling via the refrigerant circuit 10, 10' can be covered by the compressor 12 with the constant speed. The required total refrigeration output thus results from a constant portion that can be covered by a refrigerant circuit 10 with a compressor 12 that is relatively advantageous, because it is constantly operated, and a regulatable portion, the one with the speed-regulatable compressor 12', which permits the cooling output to be precisely adapted as needed. In the exemplary embodiment shown in FIG. 2, a cooling output of between 0.5 and 1.5 kW is required so that advantageously, only two refrigerant circuits, each with a respective propane capacity ≤150 g, are required to produce the total cooling output. All in all, this achieves an efficient refrigerated display case 20, which can be operated in an environmentally friendly fashion with propane as a refrigerant and can be operated in a flexible, efficient fashion because of its design.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A refrigerated display case (20) having at least one unit composed of a plurality of wall assemblies, namely a bottom assembly (22.3), a rear wall assembly, and a top assembly (22.1), which delimit a cooling space at a bottom side, a rear side, and the a top side, and having a cooling unit (1) whose components include at least one evaporator (11), one condenser (13, 13'), and one electric control unit (15), the cooling unit (1) including at least two closed refrigerant circuits (10, 10') conveying propane as a refrigerant, at least one compressor (12, 12'), and in order to variably control a cooling output, the at least one compressor (12, 12') is embodied with a speed regulation and at least one compressor (12, 12') is embodied for operation at a constant speed, wherein the propane capacity of the respective refrigerant circuits (10, 10') is ≤150 g each, and wherein a required cooling output is covered by the at least one compressor (12) with constant speed and that for covering fluctuations in the required cooling output the supplied cooling output is adjusted by means of the at least one speed-regulatable compressor (12').

2. The refrigerated display case (20) according to claim 1, characterized in that
   the at least two refrigerant circuits (10, 10') have a shared evaporator (11).

3. The refrigerated display case (20) according to claim 1, characterized in that
   the refrigerant circuits (10, 10') have a shared condenser (13) and/or a shared electric control unit (15) for controlling and/or regulating components allocated to the at least two refrigerant circuits (10, 10').

4. The refrigerated display case (20) according to claim 1, characterized in that
   the electric control unit (15) is connected via a data-transmission connection (15.1) at least to the compressor provided with a speed regulation in order to regulate the speed.

5. The refrigerated display case (20) according to claim 1, characterized in that
   a speed is capable of being regulated as a function of a temperature that is associated with the refrigerated display case (20).

6. The refrigerated display case (20) according to claim 1, characterized in that the condenser is positioned against, in, or on the rear wall assembly or the top assembly (22.1).

7. The refrigerated display case (20) according to claim 1, characterized in that
at least one of the compressors (12, 12') and/or the electric control unit is positioned in or on the top assembly (22.1).

8. The refrigerated display case (20) according to claim 1, characterized in that
the condenser has an air-cooled heat exchanger, where after having cooled the heat exchanger and before being conveyed out of the refrigerated display case (20), the air is conveyed past at least one compressor (12, 12') in order to cool the latter.

9. The refrigerated display case (20) according to claim 1, characterized in that
on a front side opposite from the rear wall assembly, the refrigerated display case (20) has a door (24) for closing the cooling space and is delimited by a respective side wall assembly (22.4) on each side.

10. The refrigerated display case (20) according to claim 1, characterized in that the refrigerated display case (20) is composed of a plurality of modules, each having the at least one unit composed a unit composed of wall assemblies.

11. A use of the refrigerated display case (20) according to claim 1 in a refrigerated display case arrangement that has at least one refrigerated display case that is capable of being mounted on a support device above a floor, for installation above a deep freezer resting on the floor.

12. The refrigerated display case (20) according to claim 1, characterized in that
the refrigerated circuits (10, 10') have a shared evaporator (11).

13. A refrigerated display case (20) having at least one unit composed of a plurality of wall assemblies, namely a bottom assembly (22.3), a rear wall assembly, and a top assembly (22.1), which delimit a cooling space at a bottom side, a rear side, and a top side, and having a cooling unit (1) whose components include at least one evaporator (11), one condenser (13, 13'), and one electric control unit (15),
the cooling unit (1) including at least two closed refrigerant circuits (10, 10') conveying propane as a refrigerant, at least one compressor (12, 12'),
wherein propane is the refrigerant conveyed in the cooling unit (1), and in order to variably control the a cooling output, the at least one compressor (12, 12') is embodied with a speed regulation and the at least one compressor (12, 12') is embodied for operation at a constant speed,
wherein the propane capacity of the respective refrigerant circuits (10, 10') is ≤150 g each, and
wherein a required cooling output is covered by the at least one compressor (12) with constant speed and that for covering fluctuations in the required cooling output the supplied cooling output is adjusted by means of the at least one speed-regulatable compressor (12').

* * * * *